United States Patent [19]

Youmans

[11] Patent Number: 4,490,730
[45] Date of Patent: Dec. 25, 1984

[54] PULSED OPTICAL STORAGE SYSTEM

[75] Inventor: Douglas G. Youmans, Watertown, Mass.

[73] Assignee: The Charles Stark Draper Laboratory, Inc., Cambridge, Mass.

[21] Appl. No.: 437,123

[22] Filed: Oct. 28, 1982

[51] Int. Cl.$^3$ .................. G01D 15/10; G01D 9/42; G11B 7/00
[52] U.S. Cl. ................... 346/76 L; 346/108; 369/44
[58] Field of Search ............... 346/76 L, 108; 369/44

[56] References Cited

U.S. PATENT DOCUMENTS

| | | | |
|---|---|---|---|
| 4,176,377 | 11/1979 | Howe | 346/76 L X |
| 4,286,318 | 8/1981 | Immink et al. | 369/44 X |
| 4,363,116 | 12/1982 | Kleuters et al. | 369/44 X |
| 4,419,750 | 12/1983 | Howe | 346/76 L X |

Primary Examiner—George H. Miller, Jr.
Attorney, Agent, or Firm—Joseph S. Iandiorio

[57] ABSTRACT

A pulsed optical storage system including: rotatable storage means; means for projecting a beam of radiation at the surface of the storage means; means for moving the means for projecting transversely relative to the surface of the storage means; means for sensing the position of the means for projecting relative to the storage means; a radiation source for providing radiation to said means for projecting, including a radiation element, and a switching circuit in close proximity to said radiation element for selectively energizing the radiation element; and a control circuit responsive to the means for sensing for selectively enabling the switching circuit to energize the radiation element to produce pulses of radiation to the means for projecting.

9 Claims, 4 Drawing Figures

PULSED OPTICAL STORAGE SYSTEM

FIELD OF INVENTION

This invention relates to a high-density optical data storage system, and more particularly to a pulsed high-power optical data storage system.

BACKGROUND OF INVENTION

Conventional high-density magnetic storage systems require that the magnetic heads be extremely close to the storage medium, for example within one micron, in order to ensure reliable high-density recording. Such close tolerances preclude the ability to easily remove and replace the disks, so the disks must be used in a unit as a disk pack, and only removed and replaced as a disk pack unit.

One attempt to maintain and increase such high-density storage yet relieve the close tolerance problem utilizes an optical ablative coating storage medium. In such devices, a disk having a highly polished surface is coated with an ablative material. The ablative coating is an opaque material which is removable or dissipatable by application of heat. In practice, a high-power light source such as a laser is used to burn off very small portions of the ablative coating, typically of one micron diameter, at specific places on the disk as it is rotated at high speed. Controls direct the laser beam to the correct radial and circumferential position. The removal of the coating bares the specular surface beneath. Subsequently when the disk is read the reflective portions can be read as "1"s and the non-reflective or still coated portions as "0"s. One shortcoming of this type of system is that a disk, once recorded on, can not be erased or rewritten. However, the system does have the advantage of permanent high-density storage and easily removable, replaceable storage disks. It is especially advantageous for permanent or archival information storage.

The laser is operated so that it is on all the time, and a lens directs the continuous light from the laser through fiberoptics to an optical switch, which passes a sharp radiation pulse to write onto the ablative disk. One shortcoming is that the duty cycle is only about 20% of the time so that the laser is on for 80% of the time without any value to the system. Since the laser output limits and life are limited by the average output power, this wastes 80% of the laser effectiveness because it is not being used except for the 20% of the time that the electro-optical device is operated. Attempts to use switching circuits to control the power to the laser have proved unsuccessful because of the inductive delay introduced by the lines interconnecting the switching circuit and the laser.

SUMMARY OF INVENTION

It is therefore an object of this invention to provide an improved optical data storage system.

It is a further object of this invention to provide such a system having longer life and higher energy output.

It is a further object of this invention to provide such a system which produces higher bit density and resolution.

It is a further object of this invention to provide such a system which produces a sharper, cleaner storage bit on the optical storage medium.

The invention features a pulsed optical storage system including rotatable storage means and means for projecting a beam of radiation onto the surface of the storage means. There are means for moving the means for projecting transversely relative to the surface of the storage means and means for sensing the position of the means for projecting relative to the storage means. A radiation source provides radiation to the means for projecting and a switching circuit in close proximity to the radiation source selectively energizes the radiation source. A control circuit responsive to the means for sensing selectively enables the switching circuit to energize the radiation source to produce pulses of radiation to the means for projecting.

In a preferred embodiment the means for sensing includes means for sensing the position of the means for projecting and means for sensing the rotational position of the storage means. The storage means may be an ablative storage means, and the radiation source may include a laser and more specifically a laser diode. The laser diode may be integral with the switching circuit.

DISCLOSURE OF PREFERRED EMBODIMENT

Other objects, features and advantages will occur from the following description of a preferred embodiment and the accompanying drawings, in which.

The invention may be accomplished with a pulsed optical storage system using rotatable ablative storage such as a disk with a heat-dissipatable coating. There are means, such as an objective lens system, for projecting a beam of radiation from the laser at the surface of the storage means to burn off a spot of the coating on the storage means and uncover the specular reflective surface. There are means for moving the object lens system transversely along the storage means. For example, if the storage means is a disk then the objective lens system is moved along a radius of the disk. There are means for sensing the position of the lens along the radius of the disk and also for sensing the rotational position of the disk. A radiation source provides radiation to the objective lens system. The radiation source includes a radiation element, such as a laser diode, and a switching circuit which is in close proximity to the radiation element. The switching circuit selectively energizes the radiation element. The radiation element is integrally structured with the switching circuit, thereby eliminating any inductive delay that might be introduced by lines extending from the switching circuit to the radiation element. A control circuit responds to an indication that the rotatable storage means is at a particular position and the objective lens is at a specific location to selectively enable the switching circuit to energize the radiation element to produce a pulse of radiation to the objective lens system, which directs the radiation at the ablative storage means to permanently store a piece of information at a desired location.

A typical ablative storage system, such as Drexon, made by Drexler Tech. Corp., uses a rotating disk and an ablative coating consisting of silver in an organic colloidal matrix. The disk is rotated continuously by a motor at 3,000–4,000 r.p.m., and a laser diode produces 2.5 watt peak power to provide light pulses 1–5 ns in width with a repetition frequency of 1–10 MHz.

It is the average power that limits the long-term operation of a laser diode in terms of life and the intensity of the laser output. In accordance with this invention the laser would be on only 5% of the time and therefore could produce shorter but much higher bursts of energy, e.g., twenty-five times the peak power available for a typical 100% duty cycle. Thus the beam could be smaller and yet provide the same amount of power. This in turn provides a smaller stored site on the ablative storage disk, which results in higher density and higher resolution. The improved laser beam energy also provides a sharper burn or removal on the ablative surface, and a cleaner burn in that it more completely removes the ablative coating in the area struck.

Figures 1, 2:
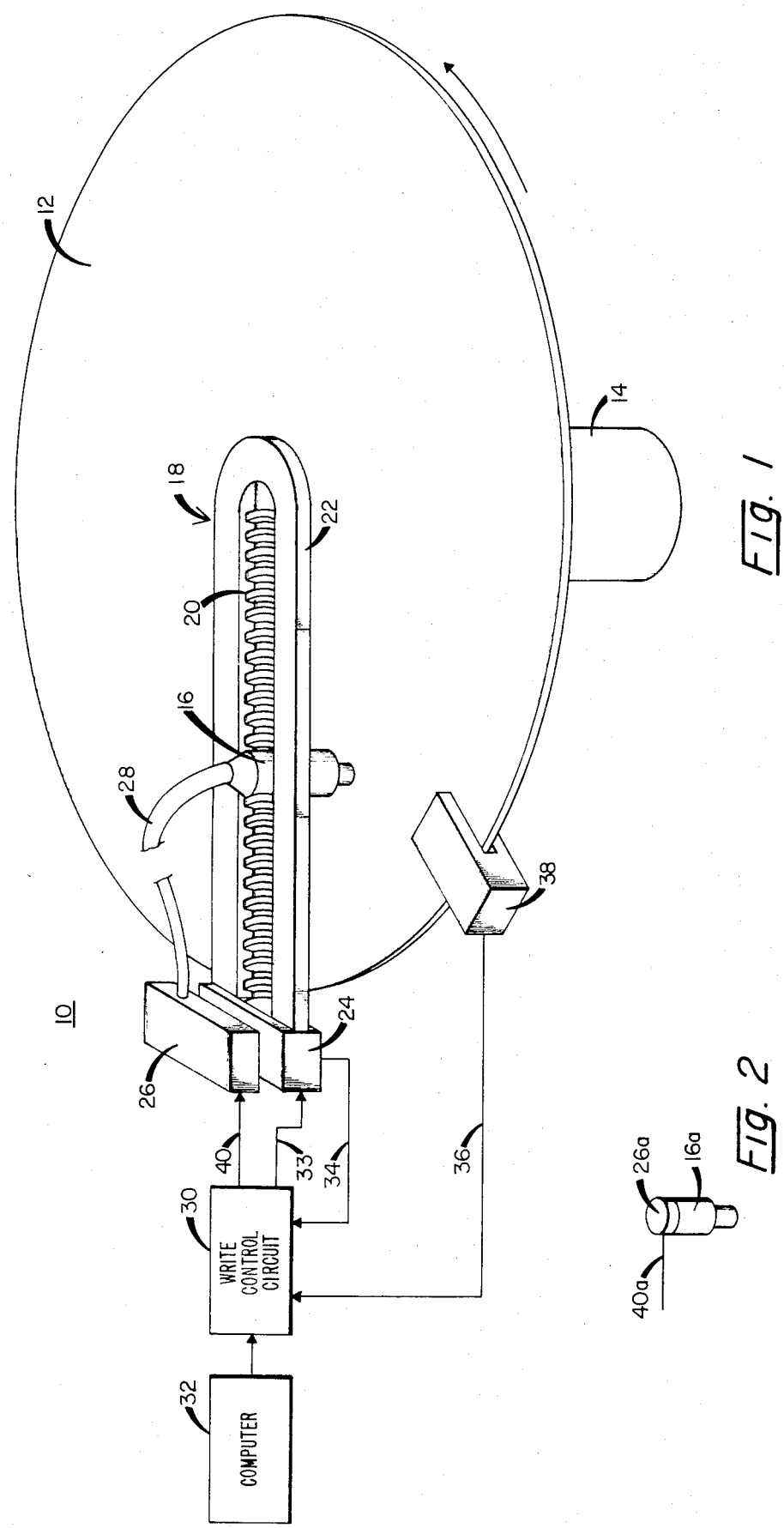
FIG. 1 is a schematic axonometric view of a high-density optical data storage system according to this invention.
FIG. 2 is an axonometric view of an alternative arrangement of the switching circuit and radiation source with the projection means of FIG. 1.

There is shown in FIG. 1 a pulsed optical storage system 10 according to this invention which includes an ablative storage disk 12 rotated by motor 14. Projecting means, objective lens system 16, such as a graded index glass rod, is mounted over disk 12 by some means 18 for moving the disk transversely, radially relative to disk 12. The means for moving may include a lead screw 20 mounted in frame 22 and driven by lead screw motor 24. Radiation source 26 has its radiant output coupled via fiberoptic element 28 to objective lens system 16. Write control circuit 30 responds to instructions from, for example, a computer 32 to enable lead screw drive 24 over line 33 to position objective lens system 16 over the proper band of rotating disk 12. Lead screw drive 24 includes an encoder which feeds back the position of lens system 16 on line 34. Write control circuit 30 receives a second input on line 36 from detector 38, which indicates the rotational position of disk 12. With lens system 16 in the proper position, write control circuit 30 provides an output over line 40 to radiation source 26, as soon as detector 38 indicates that disk 12 is in the correct position to execute the write operation at the address mounted by commanded 32.

Although in the embodiment illustrated in FIG. 1 the radiation source 26 is spaced from lens system 16 and the radiation is communicated to lens system 16 by fiberoptic element 28, this is not a necessary limitation of the invention. For as shown in FIG. 2, the radiation source 26a may be directly connected with lens system 16a in order to eliminate the need for a fiberoptic element and directly provide the radiation to lens system 16.

Figure 3:
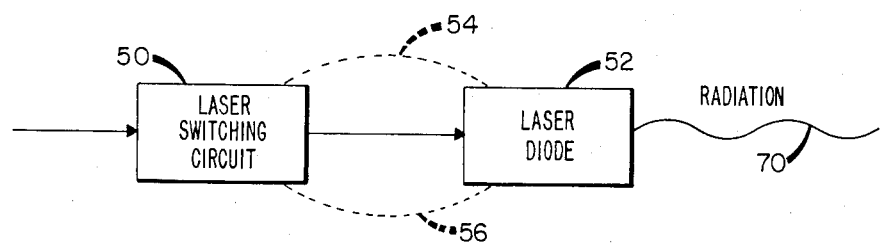
FIG. 3 is a block diagram of the radiation source of FIG. 1.
Figure 4:
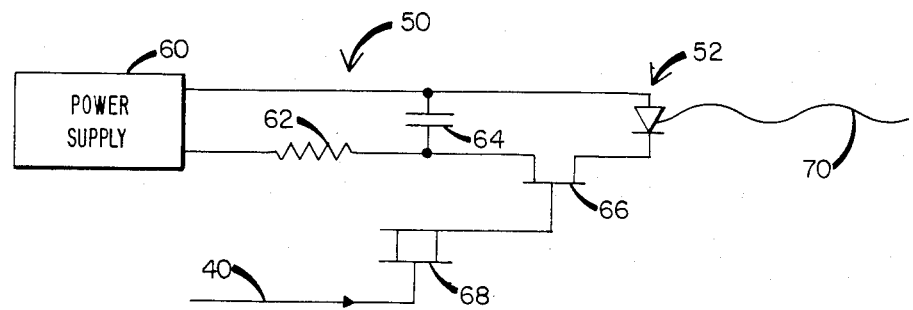
FIG. 4 is a more detailed block diagram of the laser switching circuit and laser diode of FIG. 3.

Radiation source 26, FIG. 3, includes a laser switching circuit 50 and laser diode 52, which are in close proximity, as indicated by dashed lines 54, 56, in order to eliminate the need for lead lines between them which would produce inductive delays.

Specifically, laser switching circuit 50 includes power supply 60 interconnected through a filter consisting of resistor 62 and capacitor 64 to FET switch 66 driven by a second FET switch 68. Laser diode 52 is integrally assembled with circuit 50 to minimize lead lines to the connection. Upon the receipt on line 40 of a write pulse from write control circuit 30, FET 68 switches FET 66, which connects power supply 60 across laser diode 52, causing it to emit radiation 70, which is projected by lens system 16 onto the ablative surface of disk 12.

Other embodiments will occur to those skilled in the art and are within the following claims:

What is claimed is:

1. A pulsed optical storage system comprising:
rotatable storage means;
means for projecting a beam of radiation at the surface of said storage means;
means for moving said means for projecting transversely relative to the surface of said storage means;
means for sensing the position of said means for projecting relative to said storage means;
a radiation source for providing radiation to said means for projecting, including a radiation element and a switching circuit in close proximity to said radiation element for selectively de-energizing said radiation element; and
a control circuit responsive to said means for sensing for selectively enabling said switching circuit to energize said radiation element to produce pulses of radiation to said means for projecting.

2. The storage system of claim 1 in which said means for sensing includes means for determining the position of said means for projecting and means for detecting the rotational position of said storage means.

3. The storage system of claim 1 in which said switching circuit is integrally constructed with said radiation element.

4. The storage system of claim 1 further including fiberoptic means interconnecting said radiation source and said means for projecting.

5. A pulsed optical storage system comprising:
rotatable storage means;
means for projecting a beam of radiation at the surface of said storage means;
means for moving said means for projecting transversely relative to the surface of said storage means;
means for sensing the position of said means for projecting relative to said storage means;
a radiation source for providing radiation to said means for projecting, including a laser and a switching circuit in close proximity to said laser for selectively de-energizing said laser; and
a control circuit responsive to said means for sensing for selectively enabling said switching circuit to energize said laser to produce pulses of radiation to said means for projecting.

6. A pulsed optical storage system comprising:
rotatable storage means;
means for projecting a beam of radiation at the surface of said storage means;
means for moving said means for projecting transversely relative to the surface of said storage means;
means for sensing the position of said means for projecting relative to said storage means;
a radiation source for providing radiation to said means for projecting, including a laser diode, and a switching circuit in close proximity to said laser diode for selectively de-energizing said laser diode; and
a control circuit responsive to said means for sensing for selectively enabling said switching circuit to energize said laser diode to produce pulses of radiation to said means for projecting.

7. A pulsed optical storage system comprising:
rotatable ablative storage means;
means for projecting a beam of radiation at the surface of said storage means;

means for moving said means for projecting transversely relative to the surface of said storage means;

means for sensing the position of said means for projecting relative to said storage means;

a radiation source for providing radiation to said means for projecting, including a radiation element and a switching circuit in close proximity to said radiation element for selectively de-energizing said radiation element; and a control circuit responsive to said means for sensing for selectively enabling said switching circuit to energize said radiation element to produce pulses of radiation to said means for radiation element.

8. A pulsed optical storage system comprising:
rotatable ablative storage means;
means for projecting a beam of radiation at the surface of said storage means;
means for moving said means for projecting transversely relative to the surface of said storage means;

means for sensing the position of said means for projecting relative to said storage means;

a radiation source for providing radiation to said means for projecting, including laser diode and a switching circuit integrally constructed with said laser diode for selectively de-energizing said laser diode; and a control circuit responsive to said means for sensing for selectively enabling said switching circuit to energize said laser diode to produce pulses of radiation to said laser diode.

9. The storage system of claim 8 further including fiberoptic means interconnecting said radiation source and said means for projecting.

* * * * *